Patented Nov. 6, 1923.

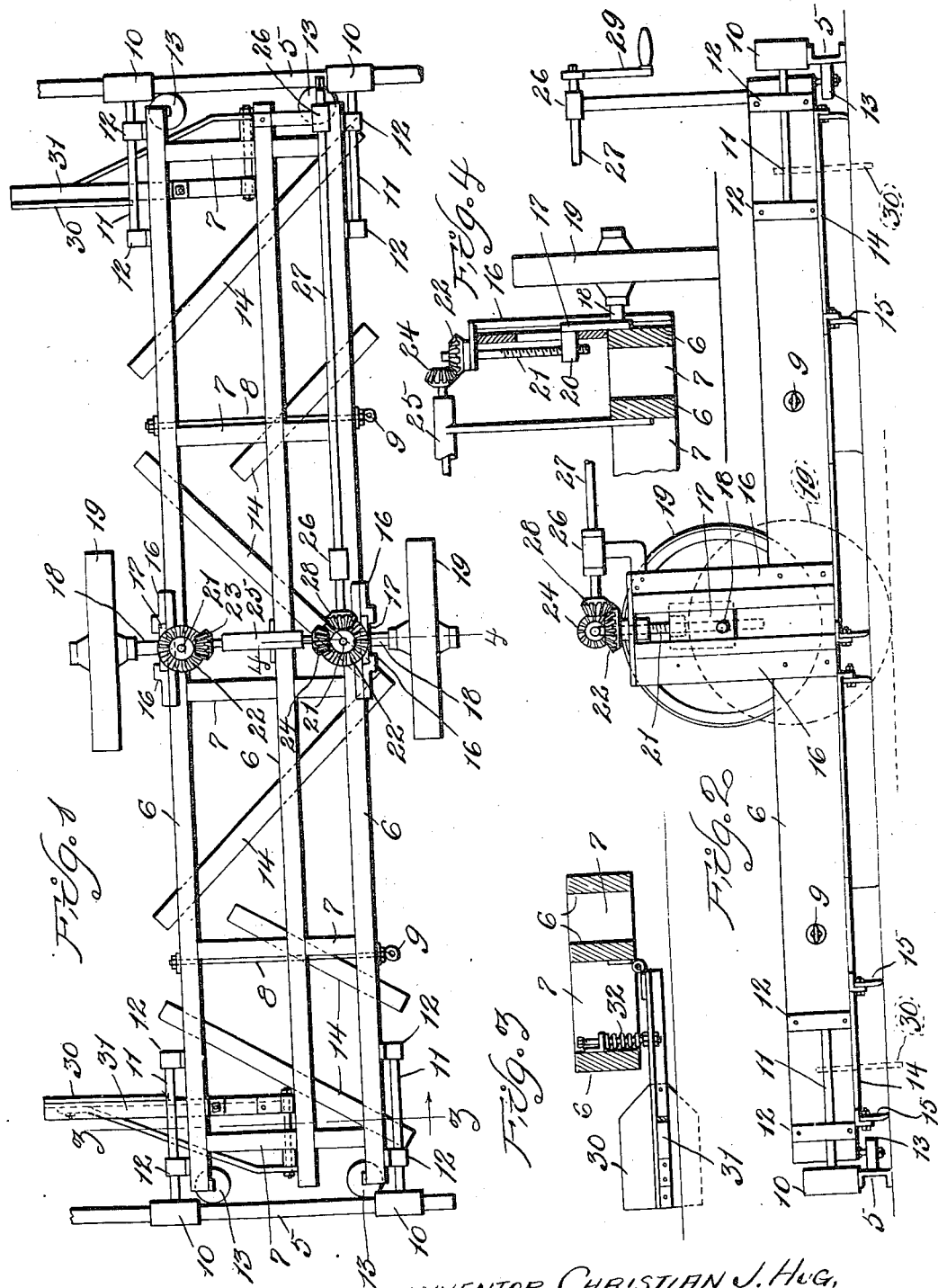

1,473,372

UNITED STATES PATENT OFFICE.

CHRISTIAN J. HUG, OF HIGHLAND, ILLINOIS.

SUBGRADING MACHINE.

Application filed April 13, 1922. Serial No. 552,386.

*To all whom it may concern:*

Be it known that I, CHRISTIAN J. HUG, a citizen of the United States, residing at Highland, in the county of Madison and State of Illinois, have invented certain new and useful Improvements in Subgrading Machines, of which the following is a specification, reference being had therein to the accompanying drawing.

My invention relates to improvements in sub-grading machines and has for its object to provide a grading and levelling machine particularly adapted to that form of street-making and road making wherein side curbs or mold-members are employed to serve as forms for the parallel outer edges of the road-bed. My machine is intended to rest and travel upon said curbs when operating, and is guided by elements carried by the machine bearing against said curbs, and other elements carried by the machine which cut into the earth for the relief of side pressures upon said curbs. When not operating the machine is designed to travel upon wheels which are arranged to be normally held above the plane of the points upon which the machine rests when operating and be lowered beneath the level of said plane, by means accessible to an operator standing at the side of the machine beyond said curb, to carry the machine when it is desired to transport the same in inoperative condition. Other features of my improvements will be apparent from the following description.

Drawings.

Fig. 1 is a top plan view of a machine embodying my invention.

Fig. 2 is a front elevation of the same in operative position upon the curbs.

Fig. 3 is a transverse sectional elevation taken on the line indicated 3—3 of Fig. 1, showing the means for relieving side pressures on the curbs, and Fig. 4 is a fragmental, transverse sectional elevation, taken on the line 4—4 of Fig. 1, showing the means for raising and lowering the transporting wheels.

Description.

In the drawings the curbs or side-forms are indicated as 5—5, and are of channel form. The longitudinal beams 6—6 are spaced apart and held by the transverse spacer blocks 7 and tie rods 8, the latter having draft eyes 9 to which traction means may be connected. The rollers 10 rest on the curbs 5 and carry the weight of the frame when the machine is in operative position and are mounted on the shafts 11, mounted in bearings 12.

Guide rollers 13 are mounted in a horizontal plane and in operative relation to the rollers 10 as shown in Fig. 2 to contact with the inner faces of the curbs 5.

The angles 14 are secured to the beams 6 and blades 15 are secured to the angles 14 as detailed in Fig. 2. To the outer beams 6 there are secured vertical slide bearings 16 for the blocks 17, projecting from which are the stub-axles 18, carrying the pair of wheels 19 mounted at a right angle to the path of travel of the machine. Projecting from each block 17 is an internally threaded boss 20, as shown in Fig. 4, through each of which is extended a threaded shaft 21, which have secured at their upper ends the bevel gears 22. Mounted in a bearing 23 between the wheels 22 is a shaft 24 carrying wheels 25 in mesh with the wheels 22, and mounted in bearings 26, is a shaft 27, carrying a wheel 28, in mesh with one of the wheels 22 and which shaft 27 extends to a point over one of the curbs 5 whereat a crank, or the like 29, is provided for manipulation by an operator standing at the side of the street or roadway. Obviously upon a rotation of the crank, both of the threaded shafts 21 will be rotated and the wheels 19 selectively positioned in either transporting or in road making positions.

The various angles 14 and blades 15 carried thereby may be grouped for the specific work to be performed, though their preferred arrangement is shown in Fig. 1, they are always to be set at an angle to the path of travel of the machine, as defined by the curbs 5, and hence by reason of unequal loads on the blades 15 there are times when such pressures are exerted laterally on the curbs as to relatively spread or disalign the curbs. To this end I have provided a pair of straight-bladed colters 30, as shown in Fig. 3, arranged to "cut" into the earth and thus prevent lateral movement of the whole machine. By preference the colters are carried on trussed frames, such as 31, pivotally secured to the machine frame and provided with yielding pressure devices, such as springs 32 to hold them in working condition.

Claims.

1. In a sub-grading machine the combination of a frame; grading blades carried by said frame; rollers supporting the frame when in operative position; means for engagement with curbs for guiding the machine and means incorporated to guide the device on the curbs.

2. In a sub-grading machine the combination of a frame; grading blades carried by said frame; rollers carried by said frame for engagement with curbs for supporting and guiding the machine; and a resiliently mounted blade-like colter for the relief of pressures on said curbs and guiding rollers.

In testimony whereof I hereunto affix my signature.

CHRISTIAN J. HUG.